(12) United States Patent
Hashimoto

(10) Patent No.: US 8,495,254 B2
(45) Date of Patent: Jul. 23, 2013

(54) COMPUTER SYSTEM HAVING VIRTUAL STORAGE APPARATUSES ACCESSIBLE BY VIRTUAL MACHINES

(75) Inventor: Akiyoshi Hashimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/285,431

(22) Filed: Oct. 31, 2011

(65) Prior Publication Data

US 2012/0047502 A1    Feb. 23, 2012

Related U.S. Application Data

(63) Continuation of application No. 12/369,179, filed on Feb. 11, 2009, now Pat. No. 8,176,211, which is a continuation of application No. 11/143,440, filed on Jun. 3, 2005, now Pat. No. 7,519,745, which is a continuation of application No. 10/807,173, filed on Mar. 24, 2004, now Pat. No. 7,093,035.

(30) Foreign Application Priority Data

Feb. 3, 2004 (JP) ................................. 2004-026575

(51) Int. Cl.
*G06F 3/00* (2006.01)
(52) U.S. Cl.
USPC .................................... 710/8; 710/10; 710/36
(58) Field of Classification Search
None
See application file for complete search history.

(56) References Cited

U.S. PATENT DOCUMENTS

| | | |
|---|---|---|
| 5,210,844 A | 5/1993 | Shimura et al. |
| 5,568,629 A | 10/1996 | Gentry et al. |
| 5,572,694 A | 11/1996 | Uchino et al. |
| 5,592,638 A | 1/1997 | Onodera |
| 5,659,786 A | 8/1997 | George et al. |
| 5,704,055 A | 12/1997 | George et al. |
| 5,790,852 A | 8/1998 | Salm |
| 5,829,053 A | 10/1998 | Smith et al. |

(Continued)

FOREIGN PATENT DOCUMENTS

| | | |
|---|---|---|
| DE | 10014448 | 11/2000 |
| DE | 102004028807 | 8/2005 |

(Continued)

OTHER PUBLICATIONS

Interview with EP Examiner conducted Jul. 31, 2007, including English translation, 3 pages.

(Continued)

*Primary Examiner* — Idriss N Alrobaye
*Assistant Examiner* — David Martinez
(74) *Attorney, Agent, or Firm* — Mattingly & Malur, PC

(57) ABSTRACT

The computer system includes a server being configured to manage a first virtual machine to which a first part of a server resource included in the server is allocated and a second virtual machine to which a second part of the server resource is allocated. The computer system also includes a storage apparatus including a storage controller and a plurality of storage devices and being configured to manage a first virtual storage apparatus to which a first storage area on the plurality of storage devices is allocated and a second virtual storage apparatus to which a second storage area on the plurality of storage devices is allocated. The first virtual machine can access to the first virtual storage apparatus but not the second virtual storage apparatus and the second virtual machine can access to the second virtual storage apparatus but not the first virtual storage apparatus.

10 Claims, 18 Drawing Sheets

U.S. PATENT DOCUMENTS

| | | |
|---|---|---|
| 5,974,515 A | 10/1999 | Bachmat et al. |
| 6,021,481 A | 2/2000 | Eickemeyer et al. |
| 6,247,109 B1 | 6/2001 | Kleinsorge et al. |
| 6,279,046 B1 | 8/2001 | Armstrong et al. |
| 6,330,653 B1 | 12/2001 | Murray et al. |
| 6,438,671 B1 | 8/2002 | Doing et al. |
| 6,446,141 B1 | 9/2002 | Nolan et al. |
| 6,457,102 B1 | 9/2002 | Lambright et al. |
| 6,484,245 B1 | 11/2002 | Sanada |
| 6,542,926 B2 | 4/2003 | Zalewski et al. |
| 6,553,408 B1 | 4/2003 | Merrell et al. |
| 6,606,690 B2 | 8/2003 | Padovano |
| 6,640,278 B1 | 10/2003 | Nolan et al. |
| 6,654,830 B1 | 11/2003 | Taylor et al. |
| 6,725,352 B2 | 4/2004 | Goodman et al. |
| 6,728,836 B1 | 4/2004 | Lambright et al. |
| 6,738,854 B2 | 5/2004 | Hoese et al. |
| 6,742,090 B2 | 5/2004 | Sanada et al. |
| 6,754,776 B2 | 6/2004 | Conway et al. |
| 6,763,419 B2 | 7/2004 | Hoese et al. |
| 6,898,672 B2 | 5/2005 | Lambright et al. |
| 6,957,294 B1 * | 10/2005 | Saunders et al. .................. 711/4 |
| 7,007,183 B2 | 2/2006 | Rawson, III |
| 7,140,020 B2 | 11/2006 | McCarthy et al. |
| 7,228,546 B1 | 6/2007 | McCarthy et al. |
| 2002/0007366 A1 | 1/2002 | Fontijn |
| 2002/0016812 A1 | 2/2002 | Uchishiba et al. |
| 2002/0052914 A1 | 5/2002 | Zalewski et al. |
| 2002/0065982 A1 | 5/2002 | Colligan |
| 2002/0069335 A1 | 6/2002 | Flylnn, Jr. et al. |
| 2002/0099901 A1 | 7/2002 | Tanaka et al. |
| 2002/0124040 A1 | 9/2002 | Foster et al. |
| 2002/0133539 A1 | 9/2002 | Monday |
| 2002/0178143 A1 | 11/2002 | Fujimoto |
| 2003/0009648 A1 | 1/2003 | Doing et al. |
| 2003/0037092 A1 | 2/2003 | McCarthy et al. |
| 2003/0055933 A1 | 3/2003 | Ishizaki et al. |
| 2003/0065898 A1 | 4/2003 | Flamma et al. |
| 2003/0084241 A1 | 5/2003 | Lubbers et al. |
| 2003/0097393 A1 | 5/2003 | Kawamoto et al. |
| 2003/0110263 A1 | 6/2003 | Shillo |
| 2003/0115434 A1 | 6/2003 | Mahalingam et al. |
| 2003/0120751 A1 | 6/2003 | Husain et al. |
| 2003/0131182 A1 | 7/2003 | Kumar et al. |
| 2003/0182501 A1 | 9/2003 | George et al. |
| 2003/0191904 A1 | 10/2003 | Iwami et al. |
| 2003/0200247 A1 | 10/2003 | Banzhaf et al. |
| 2003/0212873 A1 | 11/2003 | Lee et al. |
| 2004/0003063 A1 | 1/2004 | Ashok et al. |
| 2004/0049564 A1 | 3/2004 | Ng et al. |
| 2004/0111580 A1 | 6/2004 | Weber et al. |
| 2004/0111596 A1 | 6/2004 | Rawson, III |
| 2005/0010722 A1 | 1/2005 | Chen |
| 2005/0015546 A1 | 1/2005 | Zohar et al. |
| 2005/0071446 A1 | 3/2005 | Graham et al. |
| 2005/0091453 A1 | 4/2005 | Shimada et al. |
| 2006/0010031 A1 | 1/2006 | Higuchi et al. |
| 2006/0168652 A1 | 7/2006 | Camble et al. |

FOREIGN PATENT DOCUMENTS

| | | |
|---|---|---|
| EP | 1098249 | 5/2001 |
| EP | 13574716 | 10/2003 |
| EP | 1385091 | 1/2004 |
| FR | 2865818 | 8/2005 |
| GB | 2410816 | 8/2005 |
| JP | 2002-222110 | 8/2002 |
| JP | 2003-157177 | 5/2003 |
| JP | 2003-296037 | 10/2003 |
| JP | 2005-128733 | 5/2005 |
| WO | 02/35359 | 5/2002 |
| WO | 03/088002 A2 | 10/2003 |

OTHER PUBLICATIONS

English translation of Foreign Office Action, Nov. 23, 2010, corrected copy.

* cited by examiner

FIG.2

| Virtual computer number 401 | Logical unit number 402 | Virtual disk number 403 | Virtual storage System number 404 |
|---|---|---|---|
| 0 | 0 | 121 | 0 |
| 0 | 1 | 122 | 0 |
| 0 | 2 | 123 | 0 |
| 1 | 3 | 16 | 1 |
| 1 | 4 | 17 | 1 |
| 1 | 5 | 18 | 1 |
| ⋮ | ⋮ | ⋮ | |

Virtual disk control table 221, 121, 321

FIG.3

| Virtual disk number (501) | Logical block address (502) | Physical disk number (503) | physical block address (504) |
|---|---|---|---|
| 121 | 0x00000000 | 8 | 0x00000000 |
|  | 0x80000000 | 9 | 0x00000000 |
| 122 | 0x00000000 | 10 | 0x10000000 |
| ⋮ | ⋮ | ⋮ | ⋮ |

Disk address translation table 222

FIG.4

| Virtual computer number | Virtual disk number | Capacity of disk cache | Control processor | I/O adaptor |
|---|---|---|---|---|
| 0 | 121 | 512MB | 48 | 0 |
|   | 122 |       | 49 | 1 |
|   | 123 |       | 50 | 2 |
| 1 | 16  | 256MB | 112 | 3 |
|   | 17  |       | 113 | 4 |
|   | 18  |       |     |   |
| ⋮ | ⋮ | ⋮ | ⋮ | ⋮ |

601, 602, 603, 604, 605

Storage resource control table 323, 223, 123

FIG.5

| Virtual computer number / 701 | CPU allocation / 702 | Memory capacity / 703 | I/O adaptor / 704 |
|---|---|---|---|
| 0 | 20% | 512MB | 0<br>1<br>2 |
| 1 | 30% | 128MB | 3<br>4 |
| ⋮ | ⋮ | ⋮ | ⋮ |

Server resource control table ⟶ 324, 124, 224

FIG.17

| Virtual computer number 601 | Virtual disk number 602 | Capacity of disk cache 603 | Control processor 604 | Channel adaptor 605 | Bandwidth Of internal network 1300 |
|---|---|---|---|---|---|
| 0 | 121<br>122<br>123 | 512MB | 48<br>49<br>50 | 0<br>1<br>2 | 20% |
| 1 | 16<br>17<br>18 | 256MB | 112<br>113 | 3<br>4 | 10% |
| ... | ... | ... | ... | ... | |

Storage resource control table 323, 223

COMPUTER SYSTEM HAVING VIRTUAL STORAGE APPARATUSES ACCESSIBLE BY VIRTUAL MACHINES

CROSS-REFERENCES

This is a continuation application of U.S. Ser. No. 12/369,179, filed Feb. 11, 2009, which is a continuation application of U.S. Ser. No. 11/143,440, filed Jun. 3, 2005 (now U.S. Pat. No. 7,519,745), which is a continuation application of U.S. Ser. No. 10/807,173, filed Mar. 24, 2004, (now U.S. Pat. No. 7,093,035), which claim priority from Japanese application JP 2004-026575, filed Feb. 3, 2004. The entire disclosures of all of the above-identified applications are hereby incorporated by reference.

BACKGROUND OF THE INVENTION

1. Field of the Invention

The present invention relates to a computer system and more particularly to logical partitioning technology which involves storages of computer systems connected with storage systems.

2. Description of the Related Art

One approach to improving the performance of an information processing system is to increase the number of computers in an information processing system. However, the use of many computers in a system poses the following problem: it necessitates a troublesome task of controlling individual computers, requires a larger footprint for the computers and consumes more electric power. As a solution to this problem, technology which logically partitions resources of a computer with a large processing capacity (LPAR: Logical Partitioning) and makes it possible to use resulting logical partitions as independent virtual computers has been proposed. This logical partitioning technology can make one computer look like a plurality of virtual computers. When allocation of resources (processor, memory, etc.) to partitions is controlled, the performance of each virtual computer is assured. With this technology, different operating systems can be freely installed in virtual computers so that each virtual computer can be turned on and off or troubleshot independently for flexible operation. In addition, the use of a smaller number of physical machines offers advantages in terms of system control, footprint and power consumption. This kind of logical partitioning technology is disclosed, for example, in JP-A No. 157177/2003 (patent literature 1).

In the logical partitioning technology which has been used so far for computers, resources of computers such as processors and memories are logically partitioned and allocated to virtual computers.

Storage systems which are used with computers include not only a storage system directly connected with a host computer but also a storage system shared by plural computers through a network. The memory area of a storage system connected with a computer is partitioned and one of resulting partitions is allocated to one of the virtual computers.

When a storage system has a file system function, it is used as a storage system which allows sharing of files among different servers, namely NAS (Network Attached Storage) as a storage system which is file-accessible from a computer. Data communication between a NAS and a host computer takes place file by file where each file should have a name and a structure which the operating system running on the host computer recognizes. For this reason, in addition to a disk drive which stores data and its controller, the NAS has a processor and a memory for operation of a file system which converts file input/output with the host computer into data input/output with the disk drive. This type of NAS does not take logical partitioning of resources into consideration.

Besides, a RAID (Redundant Array of Independent Disks) system, which is used with a large external storage system, does not presuppose logical partitioning. Even when logical partitioning is permitted in this type of RAID system, a server system just performs logical partitioning of pre-allocated storage resources and cannot reallocate the resources of the storage system and therefore allocation of resources of the whole system including the server system and storage system cannot be optimized.

SUMMARY OF THE INVENTION

An object of the present invention is to enable more efficient use of a storage system shared by plural host computers and optimize the performance of the whole system including the host computers and storages.

According to one aspect of the invention, a computer system comprises a computer device on which application software runs and a storage system which stores data required for operation of the computer device. The computer device has a first control block which logically partitions computing resources of the computer device and makes resulting partitions run as independent virtual computers. The storage system has a second control block which logically partitions storage resources of the storage system and makes resulting partitions run as independent virtual storage systems.

The system further comprises a management unit having: a first control table which controls computing resources of the computer device; a second control table which controls storage resources of the storage system; and a third control table which controls the relations between the virtual computers and the virtual storage systems. Here, the first control block logically partitions the computing resources according to settings in the first control table; and the second control block logically partitions the storage resources according to settings in the second control table.

According to the present invention, since storage resources can be logically partitioned in a way to match logical partitioning of server resources, system resources including server and storage resources can be optimally allocated.

In conventional systems, the condition of storage resources other than disks (for example, disk caches) could not be checked from the server. On the other hand, in the present invention, these resources, which considerably influence the performance, can also be allocated so that allocation of resources of the computer system is optimized.

BRIEF DESCRIPTION OF THE DRAWINGS

The invention will be more particularly described with reference to the accompanying drawings, in which:

FIG. 2 illustrates a virtual disk control table according to an embodiment of the present invention;

FIG. 3 illustrates a disk address translation table according to an embodiment of the present invention;

FIG. 4 illustrates a storage resources control table according to an embodiment of the present invention;

FIG. 5 illustrates a resources control table according to an embodiment of the present invention;

FIG. 17 illustrates a storage resources control table according to the fourth embodiment.

DETAILED DESCRIPTION OF THE PREFERRED EMBODIMENTS

Next, preferred embodiments of the present invention will be described referring to the accompanying drawings.

Figure 1:
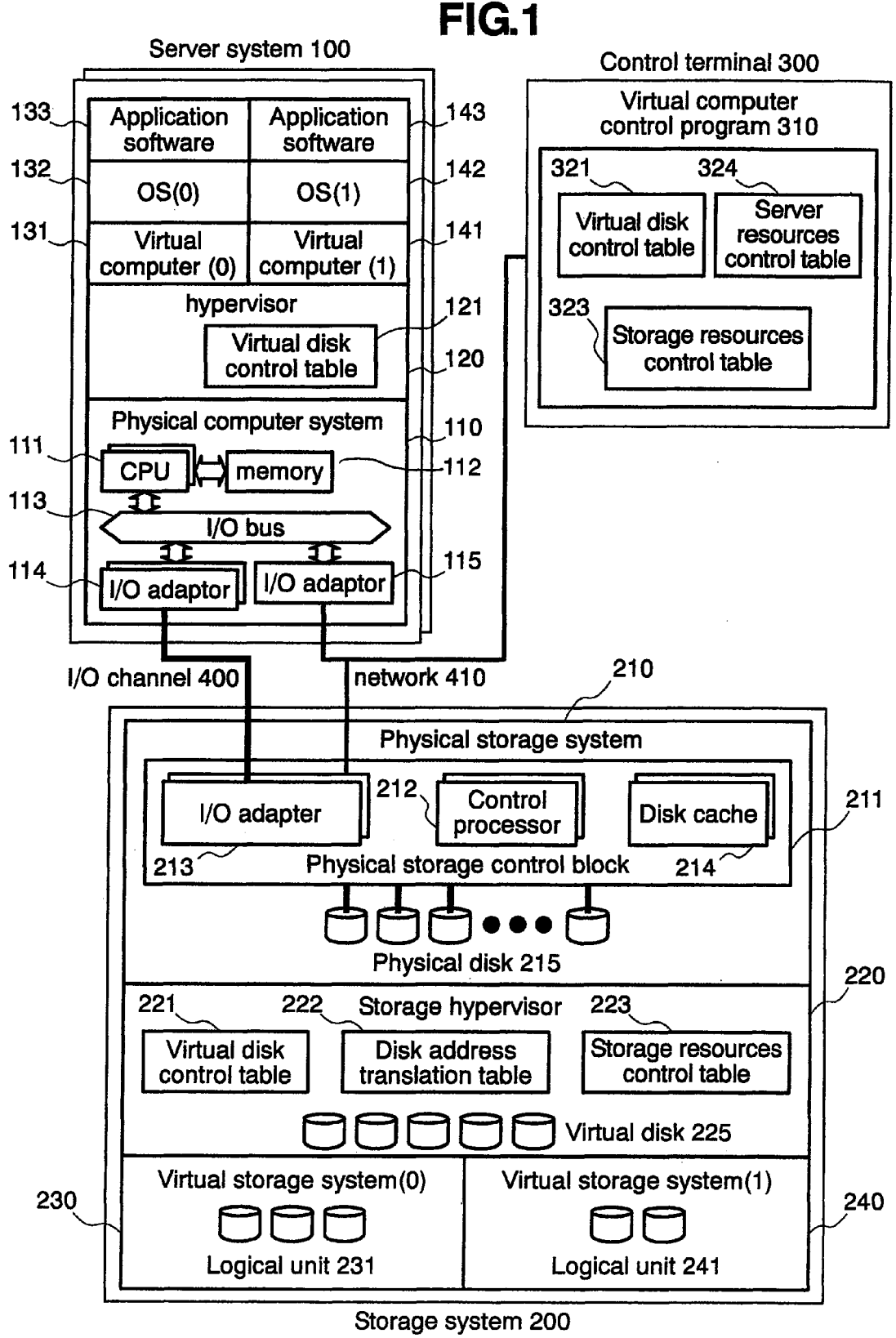
FIG. 1 is a block diagram showing the configuration of a computer system according to a first embodiment of the present invention.

Referring to FIG. 1, the first embodiment of the present invention is composed of: a server system 100 on which application software runs; a storage system 200 which stores data required for operation of the server system 100; and a control terminal 300 which controls operation of the whole computer system.

The server system 100 has a physical computer system 110 which incorporates such resources as a CPU 111, a memory 112, an I/O bus 113, and I/O adaptors 114 and 115. The CPU 111 performs computation for OS (0) 132, OS (1) 142 and application software 133 and 143 which are executed in the server system 100. The memory 112 temporarily stores programs and data required for operation of the CPU 111. The I/O bus 113 connects the CPU 111 and the I/O adaptors 114 and 115 to exchange data. The I/O adaptor 114 is connected with the storage system 200 through an I/O channel (for example, Fibre Channel) 400 and transmits a request for data input/output to the storage system 200 and receives data stored in the storage system 200. The I/O adaptor 115 is connected with the control terminal 300 through a network 410 (for example, Ethernet (registered trademark)).

In the server system 100, the plural OSs 132 and 142 run and the application software 133 and 143 respectively run under the OS (0) 132 and OS (1) 142. The application software 133 and 143 provide various services such as database service, web service to client terminals (not shown) connected with the server system 100.

The resources of the physical computer system 110 are controlled by a hypervisor 120. The hypervisor 120 is a control software which creates and controls logical partitions (i.e. virtual computers) in the server system 100. The hypervisor 120 runs on CPU 111. The hypervisor 120 creates a virtual computer (0) 131 based on computing resources in use by the OS (0) 132 and a virtual computer (1) 141 based on those by the OS (1) 142, in the physical computer system 110.

The hypervisor 120 has a virtual disk control table 121 (FIG. 2). The virtual disk control table 121 stores the same content as a virtual disk control table 221, namely data on the configuration of virtual storage systems 230 and 240 of the storage system 200.

The storage system 200 has a physical storage system 210 including such resources as a physical storage control block 211 and physical disks 215.

The physical storage control block 211 incorporates a control processor (CPU) 212, an I/O adaptor 213 and a disk cache 214. The control processor 212 controls data input/output with the physical disks 215 and also operation of the storage system 200. If the storage system 200 is a NAS (Network Attached Storage), the control processor 212 operates a file system. The I/O adaptor 213 is connected with the server system 100 through the I/O channel 400. The disk cache 214 temporarily stores data read from the physical disk 215 and data to be written into the physical disk 215 to improve access performance of the storage system 200.

The physical disk 215 is controlled by a storage hypervisor 220. The storage hypervisor 220 is a control software which creates and controls logical partitions in the storage system 200. The hypervisor 220 runs on control processor 212. The storage hypervisor 220 creates virtual disks 225. Specifically, the storage hypervisor 220 partitions the physical disk 215 into plural virtual disks 225 or combines plural physical disks 215 into a single virtual disk 225.

The storage system 200 selects one or more virtual disks 225 and offers them as memory areas to the virtual computers 131 and 141. The virtual disks thus selected are called logical units. A logical unit refers to a unit which an OS recognizes as a disk.

The logical unit incorporates a RAID (Redundant Array of Independent Disks) to make stored data redundant. Therefore, even if there is a problem in some of the physical disks 215, stored data will not be lost.

The logical units as virtual disks 225 are divided into a group of logical units 231 for the virtual storage system (0) and a group of logical units 241 for the virtual storage system (1). The virtual storage system (0) is accessed by the virtual computer (0) 131 and the virtual storage system (1) is accessed by the virtual computer (1) 141.

The storage hypervisor 220 has a virtual disk control table 221, a disk address translation table 222, and a storage resources control table 223.

The virtual disk control table 221 (FIG. 2) stores the same content as a virtual disk control table 321 incorporated in the control terminal 300.

The disk address translation table 222 (FIG. 3) defines the relations between virtual disks and physical disks and also the relations between virtual disk addresses and physical disk addresses. The disk address translation table 222 converts virtual disk addresses into physical disk addresses and vice versa.

The storage resources control table 223 stores the same content as a storage resources control table 323 incorporated in the control terminal 300.

The control terminal 300 is a computer device which controls the computer system comprehensively and executes a virtual computer control program 310. The virtual computer control program 310 has the virtual disk control table 321, storage resources control table 323 and server resources control table 324.

The virtual disk control table 321 stores the same content as the virtual disk control table 221 incorporated in the storage system 200.

The storage resources control table 323 (FIG. 4) defines the relations between the resources of the storage system 200 and the virtual computers. The storage resources control table 223 controls allocation of storage resources.

The server resources control table 324 (FIG. 5) defines the relations between the resources of the server system 100 and the virtual computers. The server resources control table 324 controls computing resources of the server system 100.

The control terminal 300 is connected with the server system 100 and the storage system 200 through a network 410. The server system 100, storage system 200 and control terminal 300 receive or send computer system control information (the contents of control tables) through the network 410.

Concretely, the virtual disk control table 321 is created by the virtual computer control program 310 and transmitted to the storage system 200 to become the virtual disk control table 221. The virtual disk control table 321 defines the configuration of virtual storage systems corresponding to virtual computers. The virtual disk control table 321 controls which virtual computer can access which logical unit.

The storage resources control table 323 is also created by the virtual computer control program 310 and transmitted to the storage system 200 to become the storage resources control table 223. The updated data in these tables are received or sent through the network 410.

The I/O channel 400 is a transmission medium which allows communication in accordance with a protocol suitable for data transmission, such as Fibre Channel. The server system 100 and storage system 200 may be connected on the one-to-one basis or through a network (SAN).

The network 410 is designed to allow communication of data and control information between computers, for example, in accordance with TCP/IP protocol. For example, it uses Ethernet.

In the first embodiment described above, it is assumed that one server system 100 is connected with one storage system 200. However, regarding either or both of the server system 100 and storage system 200, more than one such system may be used.

The above explanation assumes that one virtual computer corresponds to one virtual storage system. However, more than one virtual computer may be connected to one virtual storage system or one virtual computer may be connected with more than one virtual storage system.

FIG. 2 illustrates a virtual disk control table according to an embodiment of the present invention.

As mentioned above, the virtual disk control table 221 is created in the control terminal 300 by a user's operation of the control terminal 300 and a table with the same content is stored as a virtual disk control table 121 in the server system 100 and as a virtual disk control table 221 in the storage system 200.

The virtual disk control table 221 contains virtual computer numbers 401, logical unit numbers 402 and virtual disk numbers 403 in away that they correspond to each other. A virtual computer number 401 corresponds to a virtual computer in the server system 100. A logical unit number 402 is a number assigned to a logical unit as a virtual disk 225 identified by a virtual disk number 403.

The virtual disk control table 221 tells which virtual computer can access which logical unit (namely which virtual disk).

FIG. 3 illustrates a disk address translation table according to an embodiment of the present invention. The disk address translation table 222 is created in the storage system 200 by the storage hypervisor 220 and stores the relations between virtual disks and physical disks and the relations between virtual disk addresses and physical disk addresses, as stated above.

The disk address translation table 222 contains virtual disk numbers 501, virtual block addresses 502, physical disk numbers 503 and physical block addresses 504 in a way that they correspond to each other. A virtual disk number 501 is a number assigned to a virtual disk 225 created by the storage hypervisor 220 and corresponds to a virtual disk number 403 stored in the virtual disk control table 221. A virtual block address 502 is an address of a virtual disk 225. A virtual block address 502 corresponds to a physical block address 504 of a physical disk 215 identified by a physical disk number 503. Specifically, virtual block address 0x00000000 of virtual disk number 121 corresponds to physical block address 0x00000000 of physical disk number 8. Also, virtual block address 0x80000000 of virtual disk number 121 corresponds to physical block address 0x00000000 of physical disk number 9. In other words, virtual disk 121 is composed of physical disks 8 and 9. The disk address translation table 222 can convert virtual disk addresses into physical disk addresses and vice versa.

FIG. 4 illustrates a storage resources control table according to an embodiment of the present invention.

As mentioned above, the storage resources control table 323 is created in the control terminal 300 by a user's operation of the control terminal 300 and a table with the same content is stored as a storage resources control table 223 in the storage system 200.

In the second embodiment which will be stated later (FIG. 13), a storage resources control table 223 is created in the storage system 200. In the third embodiment which will be stated later (FIG. 14), a storage resources control table 223 is created in the server system 100.

The storage resources control table 323 contains virtual computer numbers 601, virtual disk numbers 602, disk cache capacities 603, control processor numbers 604 and I/O adaptor numbers 605 in a way that they correspond to each other. The storage resources control table 323 stores the relations between the resources of the storage system 200 (virtual disks 225, control processors 212, I/O adaptors 213, and disk caches 214) and virtual computers.

A virtual computer number 601 corresponds to a virtual computer in the server system 100. A virtual disk number 602 is a number assigned to a virtual disk 225 created by the storage hypervisor 220, which indicates a virtual disk allocated to a virtual computer identified by a virtual computer number 601. This virtual disk number 602 corresponds to a virtual disk number 403 stored in the virtual disk control table 221.

A disk cache capacity 603 is the capacity of a disk cache 214 which is allocated to a virtual computer identified by a virtual computer number 601. A control processor number 604 indicates a control processor 212 which controls access from a virtual computer identified by a virtual computer number 601 (to a virtual disk identified by a virtual disk number 602).

An I/O adaptor number 605 indicates an I/O adaptor 213 which is in charge of access from a virtual computer identified by a virtual computer number 601 (to a virtual disk identified by a virtual disk number 602).

Specifically, three virtual disks 225 (disk numbers 121-123) are allocated to the virtual computer (0) 131. For access to these virtual disks 225 (disk numbers 121-123), the virtual computer (0) 131 can use 512 megabytes of disk cache. For access from the virtual computer (0) 131 to the virtual disks 225 (disk numbers 121-123), three I/O adaptors (numbers 0-2) are used. Three control processors (CPUs) (numbers 48-50) work to process access from the virtual computer (0) 131 to the virtual disks 225 (numbers 121-123).

FIG. 5 illustrates a server resources control table according to an embodiment of the present invention.

As mentioned above, in the first embodiment, the server resources control table 324 is created in the control terminal 300 by the virtual computer control program 310.

In the second embodiment which will be stated later (FIG. 13), a server resources control table 224 is created in the storage system 200. In the third embodiment which will be stated later (FIG. 14), a server resources control table 124 is created in the server system 100.

The server resources control table contains virtual computer numbers 701, CPU allocation (percentage) 702, memory capacities 703, and I/O adaptor numbers 704 in a way that they correspond to each other. The server resources control table 324 stores the relations among the resources of the server system 100 (CPU 111, memory 112 and I/O adaptor 114).

A virtual computer number 701 corresponds to a virtual computer in the server system 100. CPU allocation 702 is the proportion of the CPU of the server system 100 which is allocated to that virtual computer. A memory capacity 703 is the capacity of the memory 112 which is allocated to that virtual computer. An I/O adaptor number 704 indicates an I/O adaptor 213 which is in charge of access from the virtual computer to the storage system 200.

Figure 6:
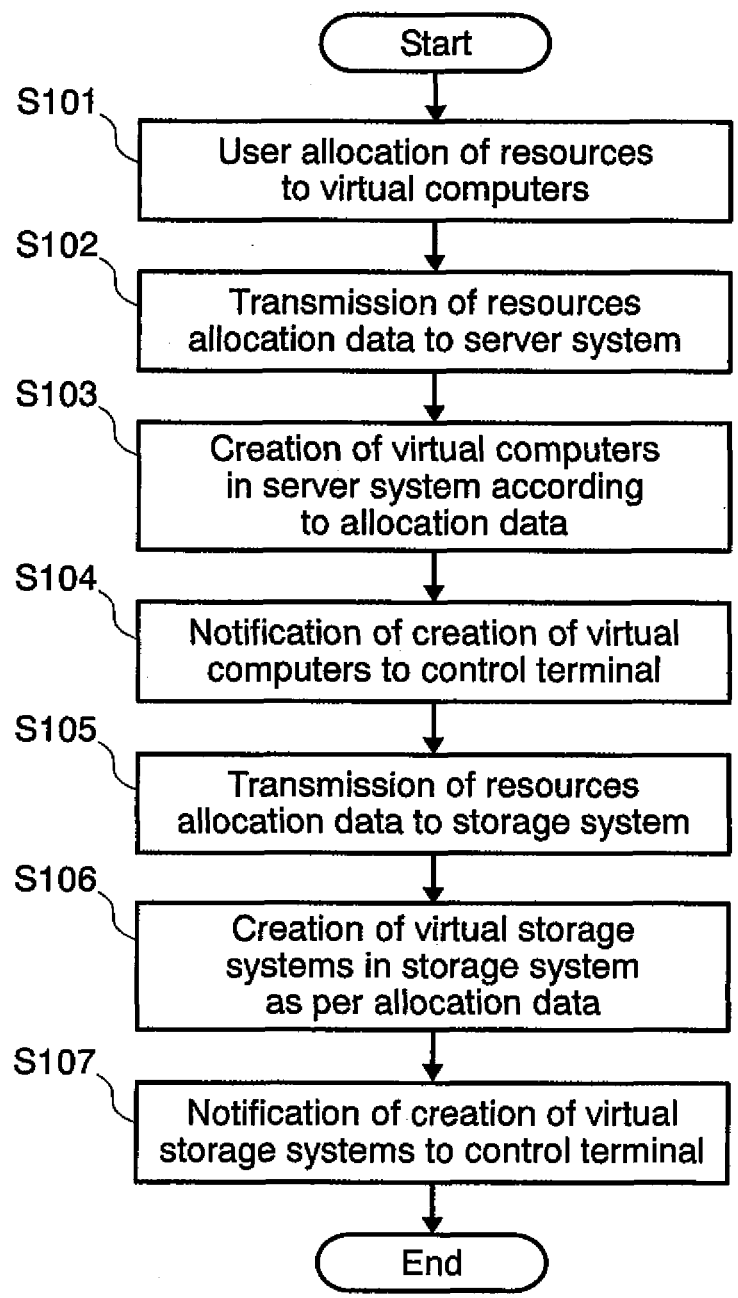
FIG. 6 is a flowchart showing a resources allocation process according to an embodiment of the present invention.

FIG. 6 shows a resources allocation process according to an embodiment of the present invention.

First, the user operates the control terminal 300 to allocate the computing resources of the server system 100 (CPU 111, memory 112, I/O adaptor 114, etc) and the resources of the storage system 200 (CPU 212, I/O adaptor 213, disk cache 214, and virtual disk 225) to individual virtual computers to update the server resources control table 324 (S101). The control terminal 300 transmits resources allocation data to the server system 100 (S102).

As the server system 100 receives resources allocation data from the control terminal 300, it allocates the computing resources of the server system 100 to create virtual computers (S103). After creation of virtual computers, it notifies the control terminal 300 of creation of virtual computers (S104).

As the control terminal 300 receives notification of creation of virtual computers from the server system 100, it transmits resources allocation data (data for updating the storage resources control table) to the storage system 200 (S105).

As the storage system 200 receives resources allocation data from the control terminal 300, it updates the storage resources control table 223 and the virtual disk control table 221 according to the allocation data to allocate the resources of the storage system 200 (S106). When necessary, the virtual disk control table 221 and the disk address translation table 222 are updated to create or update virtual storage systems (S106). After creation of virtual storage systems, the storage system 200 notifies the control terminal 300 of creation of virtual storage systems (S107).

Figure 7:
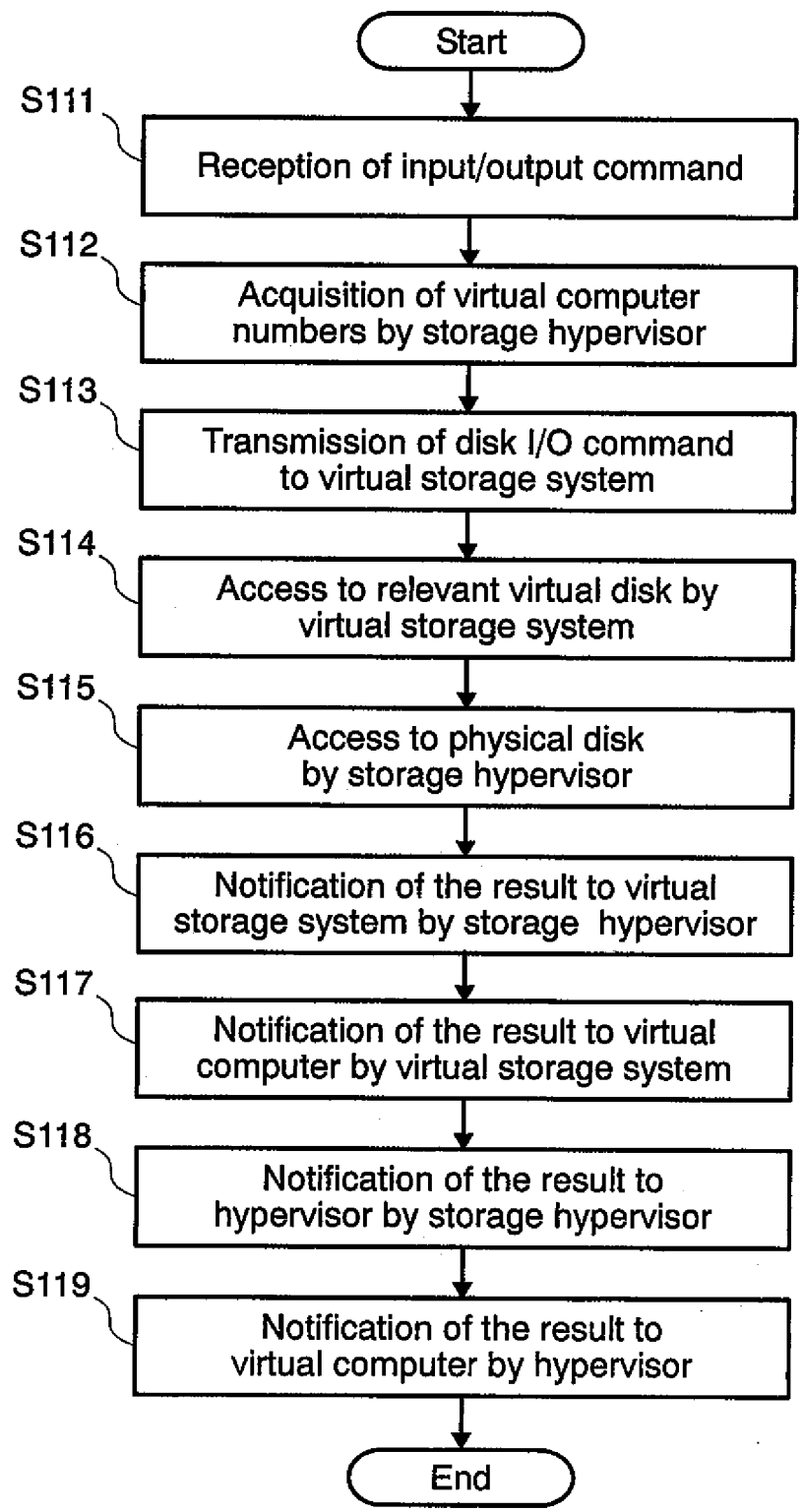
FIG. 7 is a flowchart showing a data input/output process according to an embodiment of the present invention.

FIG. 7 shows the data input/output process with the storage system 200.

The storage system 200 receives an input/output command from the server system 100 (S111). This input/output command is transmitted to the storage hypervisor 220. The storage hypervisor 220 reads a source virtual computer number 1302 and a destination virtual computer number 1303 which are included in the input/output command (hypervisor communication header 1203. (See FIGS. 9 and 10) (S112). The storage hypervisor 220 transmits hypervisor communication payload 1204 to a virtual storage system corresponding to the destination virtual computer number 1303 (S113). In this embodiment, the hypervisor communication payload 1204 includes a disk I/O command which the virtual storage system executes.

The virtual storage system acquires the number of the virtual disk to be accessed and identifies and accesses the relevant virtual disk 225 (S114).

Access to the virtual disk 225 is accepted by the storage hypervisor 220. The storage hypervisor 220 uses the disk address translation table 222 to identify the physical block address of the physical disk corresponding to the virtual block address of the virtual disk to be accessed and translates access to the virtual disk 225 into access to the physical disk 215. Then, the storage hypervisor 220 accesses the physical disk 215 and reads or writes data (S115).

Upon completion of data input/output with the physical disk 215, the storage hypervisor 220 notifies the virtual storage system of the result of data input/output (S116). As the virtual storage system receives the result of data input/output from the storage hypervisor 220, it notifies the virtual computer of the result of data input/output through the storage hypervisor 220 and hypervisor 110 (S117, S118, S119).

Next, how the server system 100 and the storage system 200 process an input/output command will be explained. Communication between the server system 100 and the storage system 200 is made through the I/O channel 400. Communication through the I/O channel 400 is explained by a protocol with a layer structure like that of Fibre Channel or Ethernet as an example.

Figure 8:
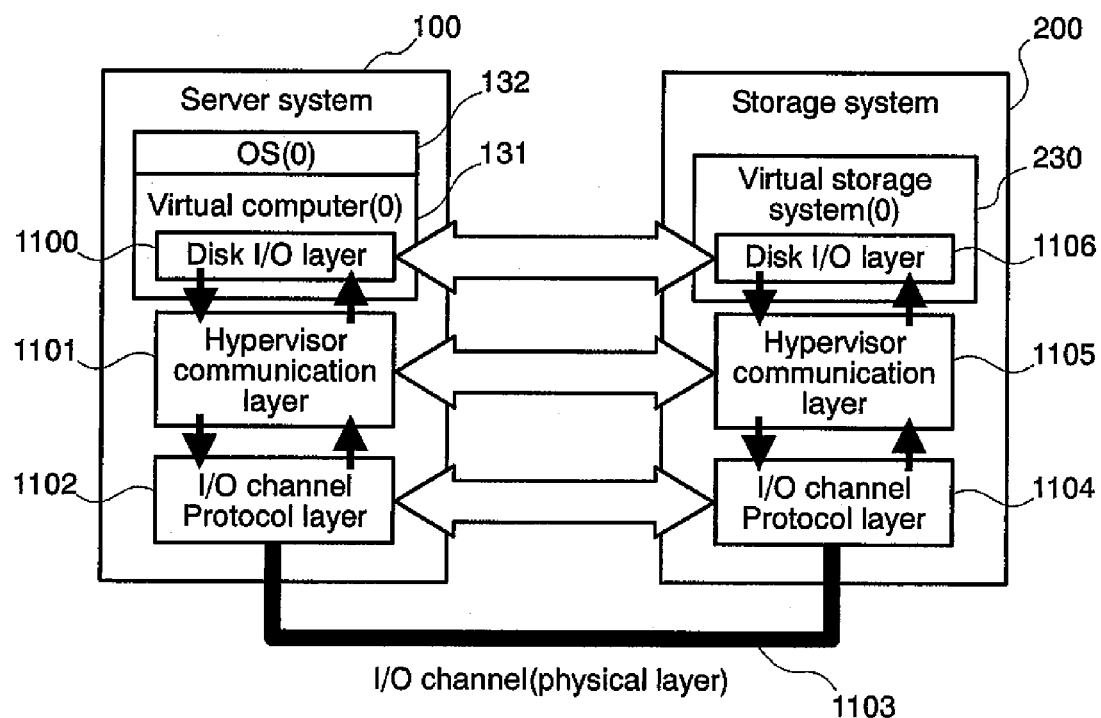
FIG. 8 illustrates the layer structure of an I/O channel communication protocol according to an embodiment of the present invention.

FIG. 8 illustrates the layer structure of a communication protocol for the I/O channel 400.

When the OS (0) 132 on the virtual computer (0) 131 accesses a logical unit in the storage system 200, input/output takes place according to a disk I/O protocol (for example, SCSI). In this embodiment, a disk I/O protocol layer is called a "disk I/O layer" 1100, 1106. A disk I/O command issued by the OS (0) 132 is received by the hypervisor 120 and a communication protocol layer exists between the hypervisor 120 and the storage hypervisor 220. This is called a "hypervisor communication layer" 1101, 1105. Furthermore, in this embodiment, a layer for general communication through the I/O channel 400 is called an "I/O channel protocol layer" 1102, 1104. A hardware layer such as a physical medium is called a "physical layer" 1103. Thanks to this layer structure, the disk I/O layers 1100 and 1106 and the hypervisor communication layers 1101 and 1105 are not affected by change in the physical medium of the I/O channel 400.

A disk I/O command issued by the OS (0) 132 is transmitted to the virtual computer (0) 131. The virtual computer (0) 131 issues the I/O command to the virtual storage system (0). Actually, the hypervisor 120 receives the I/O command. The hypervisor 120 adds information to the disk I/O command (see FIG. 9) and transmits it to the storage hypervisor 220. The storage hypervisor 220 receives it, extracts the disk I/O command from it and transmits the command to the virtual storage system (0) 230. When the layer structure is used for communication in this way, the OS (0) 132 recognizes as if it were communicating directly with the virtual storage system (0) 230.

Figure 9:
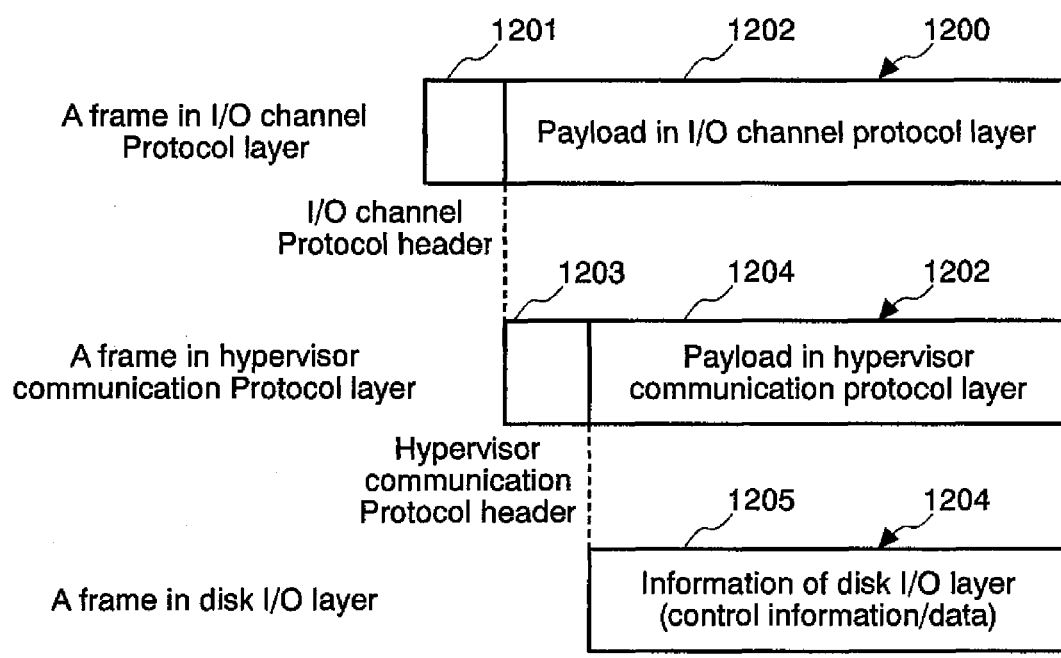
FIG. 9 illustrates data communication between a server system and a storage system according to an embodiment of the present invention.

FIG. 9 illustrates data communication between the server system 100 and the storage system 200.

In this embodiment, communication through the I/O channel 400 is made frame by frame 1200 as through Fibre Channel or Ethernet. A frame 1200 consists of an I/O channel protocol header 1201 and an I/O channel protocol payload 1202. The I/O channel protocol header 1201 contains control information required for communication via the I/O channel protocol layers 1102 and 1104. Although not shown, the control information may be a source identifier or destination identifier. The I/O channel protocol payload 1202 is data which is communicated via the I/O channel protocol layers 1102 and 1104. The I/O channel protocol layers 1102 and 1104 are not concerned with the data.

The I/O channel protocol payload 1202 consists of a hypervisor communication header 1203 and a hypervisor communication payload 1204. The hypervisor communication header 1203 contains control information required for communication via the hypervisor communication layers 1101 and 1105 (stated later). The hypervisor communication payload 1204 is data which is communicated via the hypervisor communication layers 1101 and 1105. The hypervisor communication layers 1101 and 1105 are not concerned with the data.

In this embodiment, the hypervisor communication payload 1204 consists of information necessary for communication between the disk I/O layers 1100 and 1106. Specifically, the information includes disk I/O commands or data to be transmitted. In this embodiment, the hypervisor communication payload 1204 includes information on the disk I/O layers 1100 and 1106 because the disk I/O layers are located above the hypervisor communication layers 1101 and 1105. However, if communication is made between the hypervisor and the storage hypervisor, information other than disk I/O layer information is included.

Figure 10:
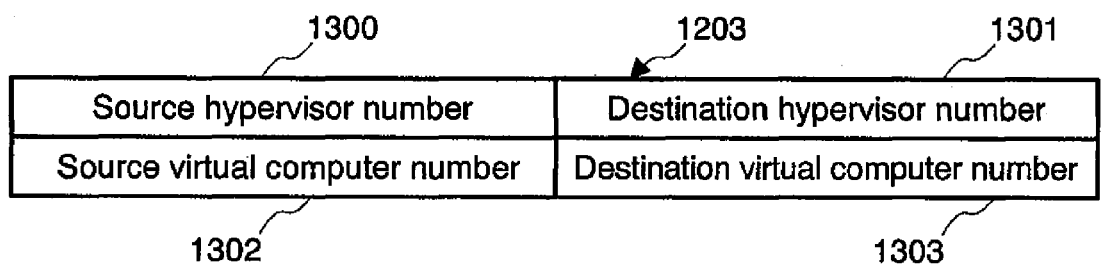
FIG. 10 illustrates a hypervisor communication header according to an embodiment of the present invention.

FIG. 10 illustrates the content of the hypervisor communication header 1203.

The hypervisor communication header 1203 is unique to embodiments of the present invention. It consists of a source hypervisor number 1300, a destination hypervisor number 1301, a source virtual computer number 1302, and a destination virtual computer number 1303. In this embodiment, unique identifiers are given to the hypervisor and the storage hypervisor to cope with a computer system which has a plurality of server systems 100 and storage systems 200.

The source hypervisor number 1300 is an identifier of a hypervisor or a storage hypervisor which sends the frame.

The destination hypervisor number 1301 is an identifier of a hypervisor or a storage hypervisor which receives the frame.

The source virtual computer number 1302 is an identifier of a virtual computer or a virtual storage system which sends the frame.

The destination virtual computer number 1303 is an identifier of a virtual computer or a virtual storage system which receives the frame.

Figure 11:
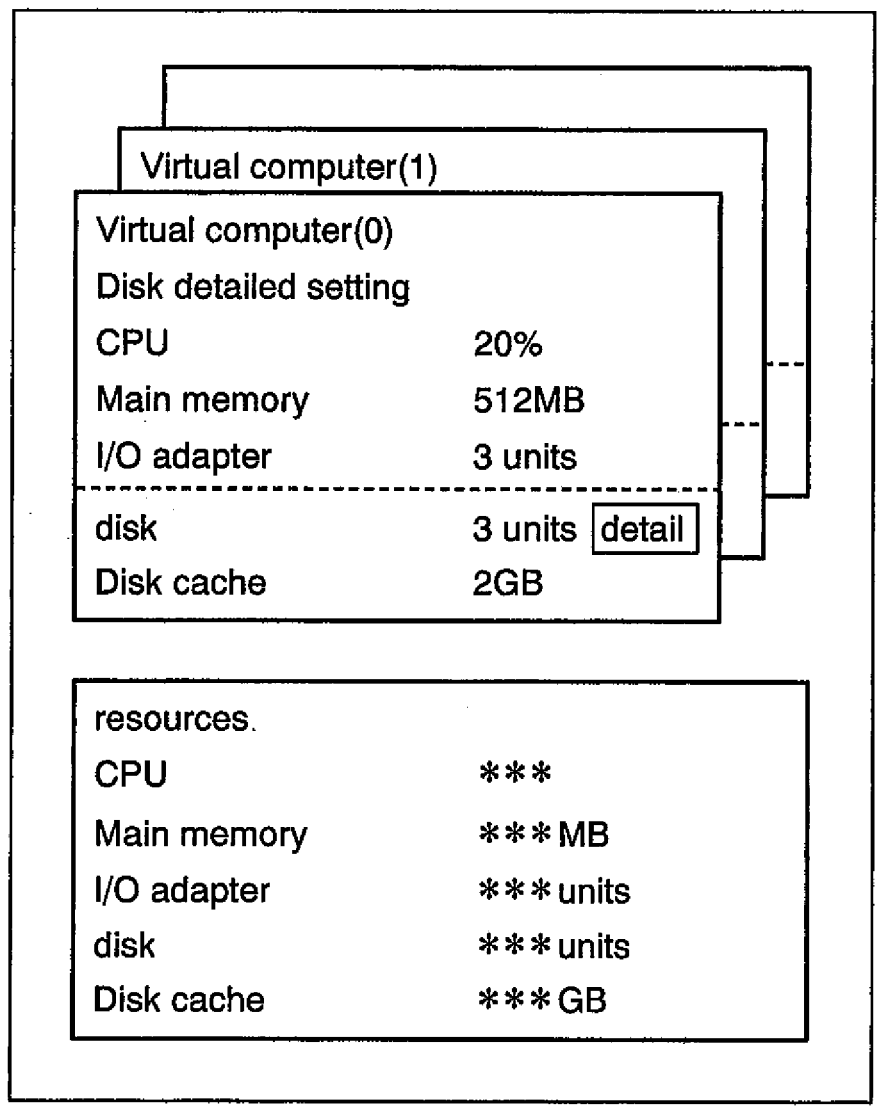
FIG. 11 illustrates a computer system configuration screen according to an embodiment of the present invention.
Figure 12:
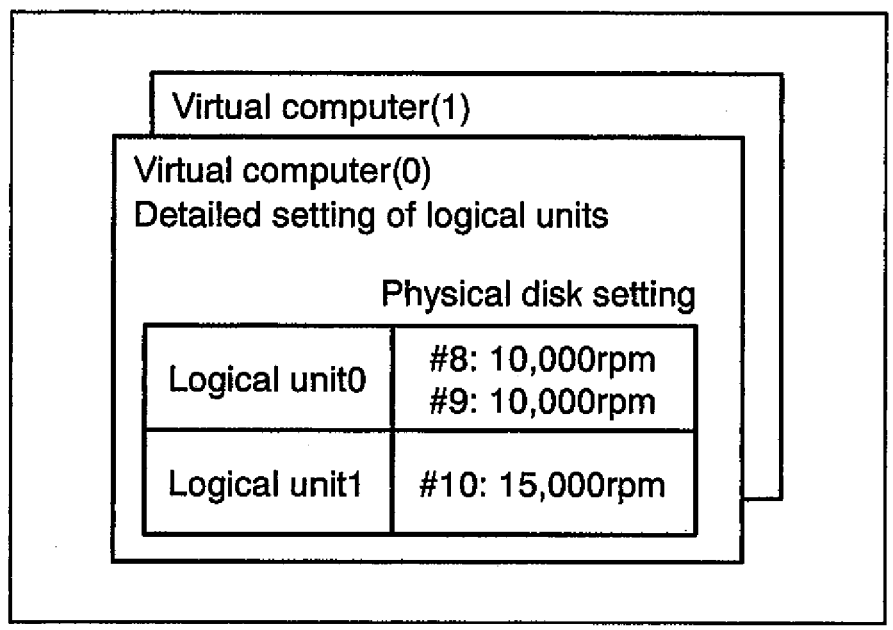
FIG. 12 illustrates a computer system configuration screen according to an embodiment of the present invention.

FIGS. 11 and 12 illustrate system configuration screens according to an embodiment of the present invention.

In the upper part of the screen, there are provided pages where resources allocated to each virtual computer are specified. In the lower part of the screen, there is provided a "resources" window showing all the resources of the server system 100 and the storage system 200. In addition to all the resources, the window may show resources which are not used (or already in use).

The administrator can specify resources for each virtual computer by writing resources of the server system or storage system in each page in the upper part of the screen or by moving resources from the "resources" window in the lower part of the screen.

Also, the administrator can specify a performance required for a virtual computer (and a virtual storage system) without the need to carry out the task of allocating resources to each virtual computer and each virtual storage system so that the required resources for the performance are calculated and set for the virtual computer and virtual storage system.

For example, for a virtual computer which places emphasis on data read performance, a larger value should be set for the capacity of the disk cache 214 which is allocated to a corresponding virtual storage system. If all the resources of the disk cache 214 are small in amount and the capacity of the disk cache 214 allocated to the virtual storage system is small, a larger memory area should be allocated to the virtual computer. On the other hand, if all the resources of the disk cache 214 are large in amount and the capacity of the disk cache 214 allocated to the virtual storage system is small, a smaller memory area is allocated to the virtual computer.

If application software running on a virtual computer randomly accesses a wide area on the disk, the cache is less effective and thus allocation of the capacity of the disk cache 214 should be small. For application software which provides the function of streaming moving pictures or other multimedia functions, the capacity of the disk cache 214 allocated to the virtual storage system should be large and the capacity of the memory 112 allocated to the virtual computer should also be large.

When the number of server systems 100 or storage systems 200 is increased or decreased, virtual computers and virtual storage systems may be configured on this screen.

Thus, the first embodiment of the present invention is summarized as follows. It has a server resources control table 324, a storage resources control table 323, and a virtual disk control table 321. The hypervisor 120 logically partitions computing resources according to settings in the server resources control table 324 and makes resulting partitions run independently as virtual computers. The storage hypervisor 220 logically partitions the storage resources according to settings in the storage resources control table 323 and makes resulting partitions run independently as virtual storage systems. Therefore, the resources of the computer system including the server system and the storage system can be comprehensively controlled and allocated optimally.

In reconfiguring a virtual computer, a corresponding virtual storage system can be reconfigured. This means that the virtual computer and virtual storage system need not be configured separately and the resources of the virtual computer and virtual storage system can be set, taking the overall performance of the computer system into consideration. Resources like the disk cache 214 which could not be controlled by the control terminal 300 in the conventional technique can be set at the same time as virtual computer resources.

In this embodiment, the user can make a detailed setting for "disk" on the configuration screen shown in FIG. 11 by calling a detailed setting window. Needless to say, the present invention does not rely on the screen display method.

FIG. 12 illustrates a detailed setting window.

The detailed setting window (FIG. 12) can be called for each virtual computer by clicking on the "detail" button shown in FIG. 11. In this embodiment, a logical unit 0 consists of two physical disks (physical disks 8 and 9). "10,000 rpm" which is shown next to each physical disk number indicates that the physical disks 8 and 9 are magnetic recording media as magnetic disks which make 10,000 round per minute. The r.p.m. of the magnetic disk is an important factor which defines the performance as the physical disk. For an application which requires a high performance, the user can select a high performance physical disk in this window to make up a logical unit. The user can also select more physical disks to increase the logical unit performance.

As discussed above, according to the present invention, storage resources can be allocated in connection with virtual computers and it is possible to allocate resources of a whole computer system including a server system and a storage system optimally.

Figure 13:
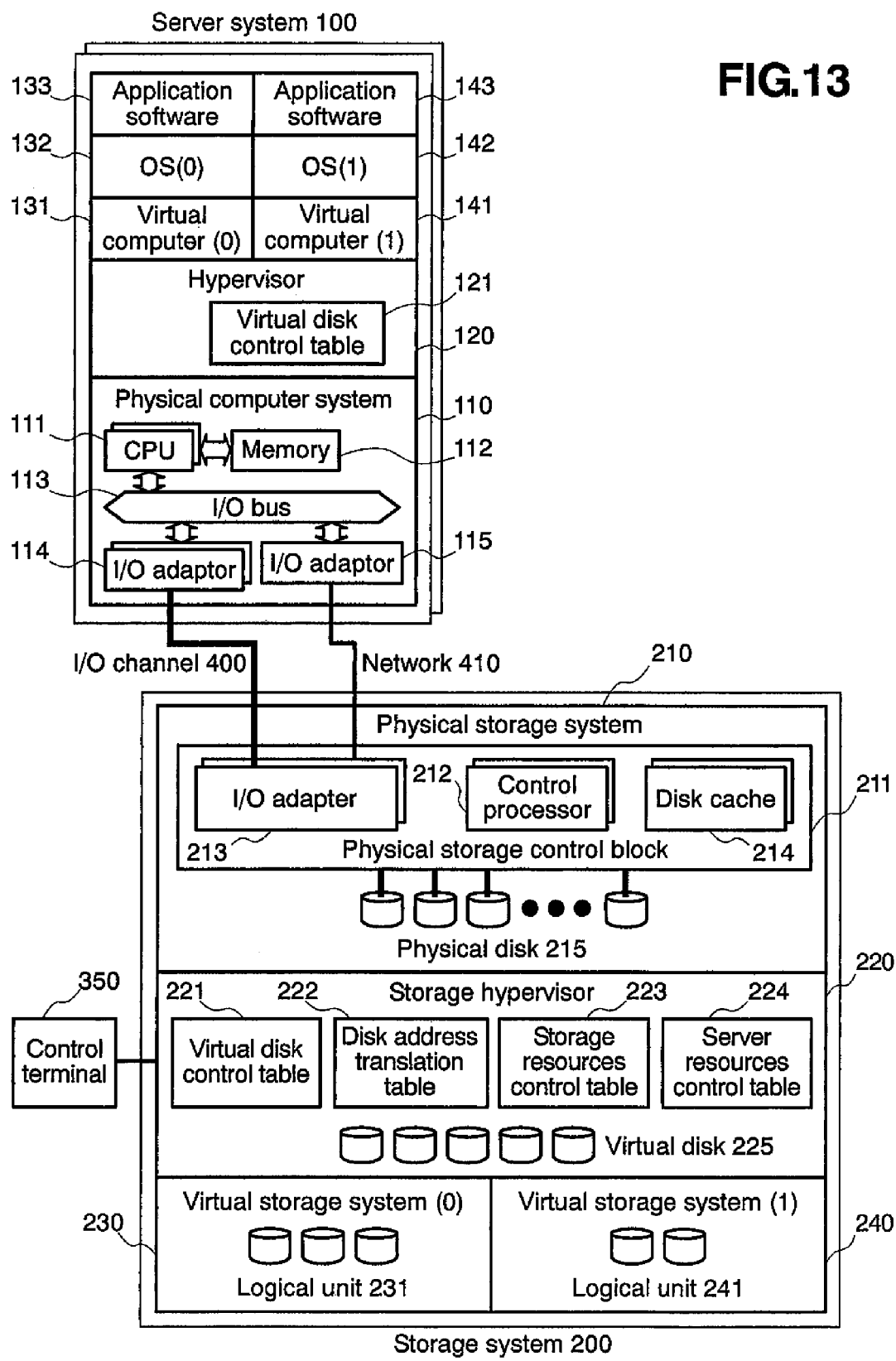
FIG. 13 is a block diagram showing the configuration of a computer system according to a second embodiment of the present invention.

FIG. 13 shows the configuration of a computer system according to a second embodiment of the present invention.

Unlike the first embodiment (FIG. 1), the second embodiment does not use a control terminal 300 and instead has the same function as that of the control terminal 300 in the first embodiment, in the storage system 200. The same elements as those in the first embodiment are designated by the same reference numerals and their detailed descriptions are omitted.

According to the second embodiment, a computer system is composed of: a server system 100 on which application software runs; a storage system 200 which controls the whole computer system and stores data required for operation of the server system 100; and a control terminal 350 which issues instructions to the storage system 200 for operation of the whole computer system.

The server system 100 has a physical computer system 110 which incorporates such resources as a CPU 111, a memory 112, an I/O bus 113, and I/O adaptors 114 and 115. The configuration and operation of the server system 100 are the same as in the first embodiment.

The storage system 200 has a physical storage system 210 including such resources as a physical storage control block 211 and physical disks 215.

The storage hypervisor 220 has a virtual disk control table 221, a disk address translation table 222, a storage resources control table 223, and a server resources control table 224.

The virtual disk control table 221 (FIG. 2), disk address translation table 222 (FIG. 3), and storage resources control table 223 (FIG. 4) are the same as those in the first embodiment. The server resources control table 224 (FIG. 5) defines the relations between the resources of the server system 100 and virtual computers. The server resources control table 224 is used to control the computing resources of the server system 100.

The storage hypervisor 220 comprehensively controls the computer system using the control tables 221, 223 and 224. A virtual computer control program which comprehensively controls the computer system using the control tables 221, 223 and 224 runs in the storage hypervisor 220.

The control terminal 350 is a computer device which is used to set control information for the computer system. It is connected with the storage system 200. Therefore, the administrator can update the storage resources control table 223 and the server resources control table 224 by operating the control terminal 350.

Thus, in addition to the above-mentioned effects of the first embodiment, the second embodiment brings about an effect that virtual storage systems can be controlled in a way to match virtual computers, without a separate control terminal, because the same function as that of the control terminal 300 is provided in the storage system 200.

Figure 14:
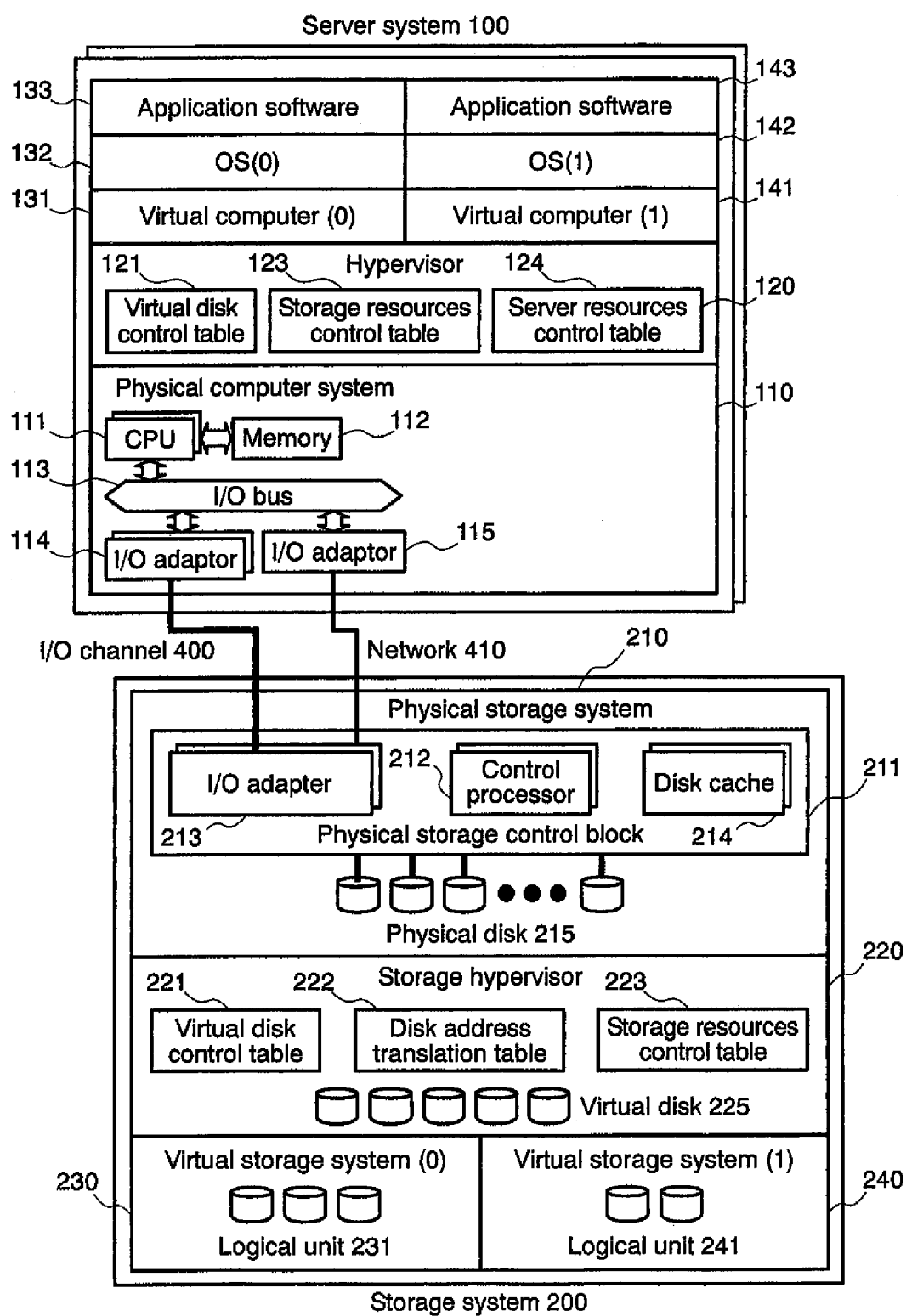
FIG. 14 is a block diagram showing the configuration of a computer system according to a third embodiment of the present invention.

FIG. 14 shows the configuration of a computer system according to a third embodiment of the present invention.

Unlike the first embodiment (FIG. 1) or the second embodiment (FIG. 13), the third embodiment does not use a control terminal 300 and instead has the same function as that of the control terminal 300 in the first embodiment, in the server system 100. The same elements as those in the first embodiment are designated by the same reference numerals and their detailed descriptions are omitted.

According to the third embodiment, a computer system is composed of: a server system 100 which has application software running thereon and controls the whole computer system, and a storage system 200 which stores data required for operation of the server system 100.

The server system 100 has a physical computer system 110 which incorporates such resources as a CPU 111, a memory 112, an I/O bus 113, and I/O adaptors 114 and 115. The configuration of the physical computer system 110 is the same as in the first embodiment.

The resources of the physical computer system 110 are controlled by a hypervisor 120. The hypervisor 120 creates a virtual computer (0) 131 based on the computing resources used by the OS (0) 132 and a virtual computer (1) 141 based on those by the OS (1) 142, in the physical computer system 110. The hypervisor 120 has a virtual disk control table 121, a storage resources control table 123, and a server resources control table 124.

The virtual disk control table 121 stores the same content as a virtual disk control table 221 in the storage system 200.

The storage resources control table 123 (FIG. 4) defines the relations between the resources of the storage system 200 and virtual computers. The storage resources control table 223 controls allocation of storage resources.

The server resources control table 124 (FIG. 5) defines the relations between the resources of the server system 100 and virtual computers. The server resources control table 224 is used to control the computing resources of the server system 100.

A virtual computer control program which comprehensively controls the computer system using the control tables 121, 123 and 124 runs in the hypervisor 120. Therefore, the administrator can update the settings in the storage resources control table 123 and the server resources control table 124 by operating the server system 100.

The storage system 200 includes a physical storage system 210 having such resources as a physical storage control block 211 and physical disks 215. The configuration of the storage system 200 is the same as in the first embodiment. The storage resources control table 223 stores the same content as the storage resources control table 123 in the server system 100.

Thus, in addition to the above-mentioned effects of the first embodiment, the third embodiment brings about an effect that virtual storage systems can be controlled in a way to match virtual computers, without a control terminal separate from the server system 110, because the same function as that of the control terminal 300 is provided in the server system 100.

Figure 15:
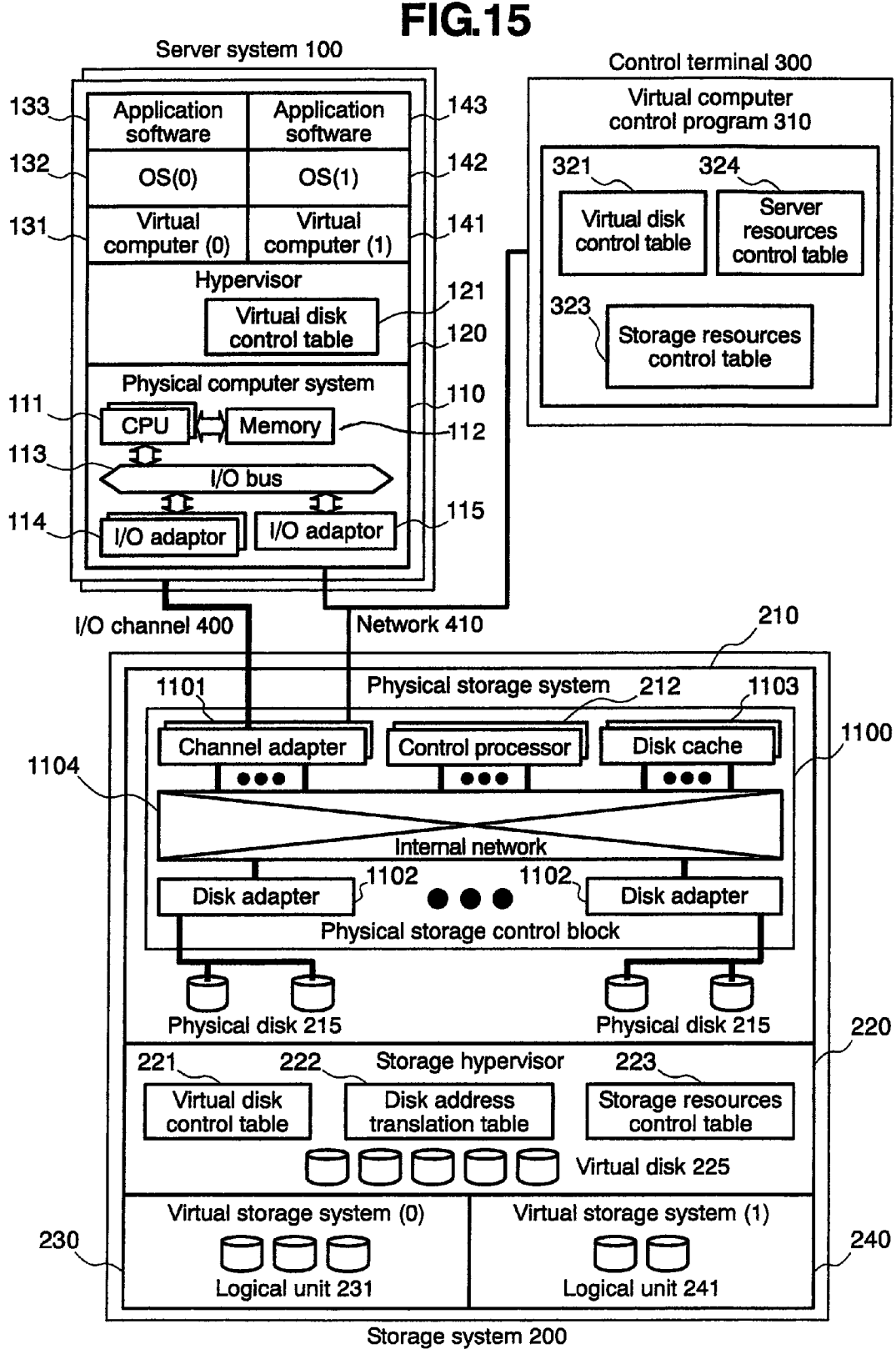
FIG. 15 is a block diagram showing the configuration of a computer system according to a fourth embodiment of the present invention.

FIG. 15 shows the configuration of a computer system according to a fourth embodiment of the present invention.

The fourth embodiment is different from the above embodiments in the structure of the physical storage control block 1100. In the physical storage control block 1100, one or more channel adaptors 1101, one or more disk adaptors 1102, one or more disk caches 1103 and one or more control processors 212 are connected through an internal network 1104. The channel adaptors control communication with the server system 100 and the disk adaptors 1102 control physical disks.

In the physical storage control block 1100 having the internal network 1104, the bandwidth of the network 1104 is an important factor which influences the performance of the storage system 200. For this reason, in this embodiment, the storage hypervisor 220 makes allocation of the bandwidth of the internal network 1104 between the virtual computer (0) 131 and virtual computer (1) 141 and the control processor 212 processes input and output according to the allocation. Various bandwidth control methods are available but the present invention does not rely on the bandwidth control method.

The constitution of the virtual disks 225 also influences the performance. As mentioned earlier, the virtual disks 225 are storage areas of the physical disks 215 which the storage hypervisor 220 makes the virtual computer (0) 131 and virtual computer (1) 141 recognize as disks. One method of creating a virtual disk 225 with improved input/output performance is to extract parts of memory areas of plural physical disks 215 and combine them into a virtual disk 225. This is because input/output requests of the virtual computer (0) 131 and virtual computer (1) 141 are processed by concurrent parallel operation of many physical disks 215.

This approach is explained below referring to FIGS. 16(a) and 16(b).

Figure 16:
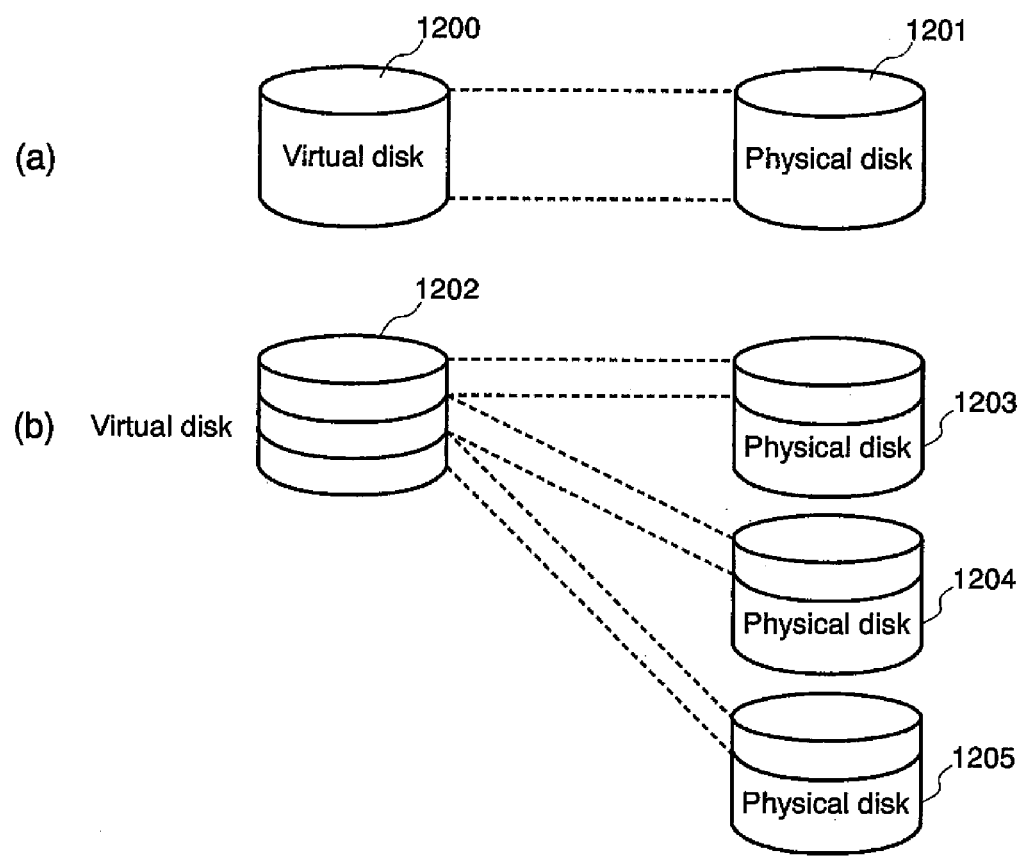
FIG. 16A illustrates the performance of a virtual disk consisting of one physical disk and FIG. 16B illustrates the performance of a virtual disk consisting of three physical disks according to the fourth embodiment of the present invention.

As shown in FIG. 16(a), a virtual disk 1200 consists of one physical disk 1201. On the other hand, as shown in FIG. 16(b), a virtual disk 1202 consists of parts of storage areas of three physical disks 1203, 1204, and 1205. The performance of the physical disk 1201 can be expressed by the number of input/output processes executed in a unit of time. When x represents this number, the input/output performance of the virtual disk 1200 is expressed as x. By contrast, assuming that the virtual computer (0) 131 and virtual computer (1) 141 access all storage areas of the virtual disk 1202 evenly, the performance of the virtual disk 1202 is expressed as 3× because the physical disks 1203, 1204 and 1205 operate in parallel concurrently. Thus, the performance of the virtual disk 1202 largely depends on the number of physical disks 215 which constitute it.

Therefore, it is desirable that the number of physical disks 215 which constitute a virtual disk 225 can be specified at the control terminal 300 according to application software etc. which the virtual computer (0) 131 and virtual computer (1) 141 execute. For example, if the virtual computer (0) 131 and virtual computer (1) 141 execute application software which permits random access to a wide area of the disk, the disk cache 214 is less effective as stated earlier. In this case, the access performance of the physical disk 215 is a dominant factor which determines the performance of the virtual disk 225. For this reason, the number of physical disks 215 which constitute a virtual disk 225 is increased in order to improve the performance of the virtual disk 215.

The control processor 212 is also one of the factors which determine the input/output performance of the storage system 200. It is also desirable that the user can specify the allocation rate of the control processor 212 at the control terminal 300 according to the input/output performance required for the virtual computer (0) 131 and virtual computer (1) 141 and application software. Depending on how the storage system 200 is constituted, it is also possible that the channel adaptor 1101 and disk adaptor 1102 each incorporate a control processor 212. If that is the case, the channel adaptor 1101 and disk adaptor 1102 which are in charge of data input/output with the virtual computer (0) 131 and the virtual computer (1) 141 are specified at the control terminal.

The storage resources control table 223 should be modified so that the resources (internal network 1104, physical disks 215, control processors 212, etc.) of the storage system 200 can be specified at the control terminal 300 as mentioned above.

FIG. 17 illustrates a storage resources control table 223 according to the fourth embodiment of the present invention.

The table shown in FIG. 17 contains a "bandwidth of internal network" column 1300 as an additional column. This column is used to specify the allocation rate of the bandwidth of the internal network 1104 for each of the virtual computer (0) 131 and virtual computer (1) 141. In this embodiment, the allocation rate is expressed as a percentage to the overall bandwidth. The control processor 212 monitors the internal network bandwidth used by the virtual computer (0) 131 and virtual computer (1) 141, and delays input/output processes as necessary to prevent the internal network bandwidth from exceeding a preset level.

Control processors are allocated through the use of the "Control processor" column 604 of the storage resources control table 223. Which control processors 212 are in charge of input/output with the virtual computer (0) 131 and virtual computer (1) 141 are specified in this column. It is expected that the more control processors are allocated to a virtual computer, the higher input/output performance it provides. It is also possible that one control processor 212 is in charge of input/output with both the virtual computer (0) 131 and virtual computer (1) 141. If that is the case, the control processor 212 monitors the CPU time which each virtual computer uses and thus controls CPU time allocation between the virtual computer (0) 131 and virtual computer (1) 141.

Allocation of physical disks is controlled by the virtual disk control table 221 in the same way as in the above embodiments.

Figure 18:
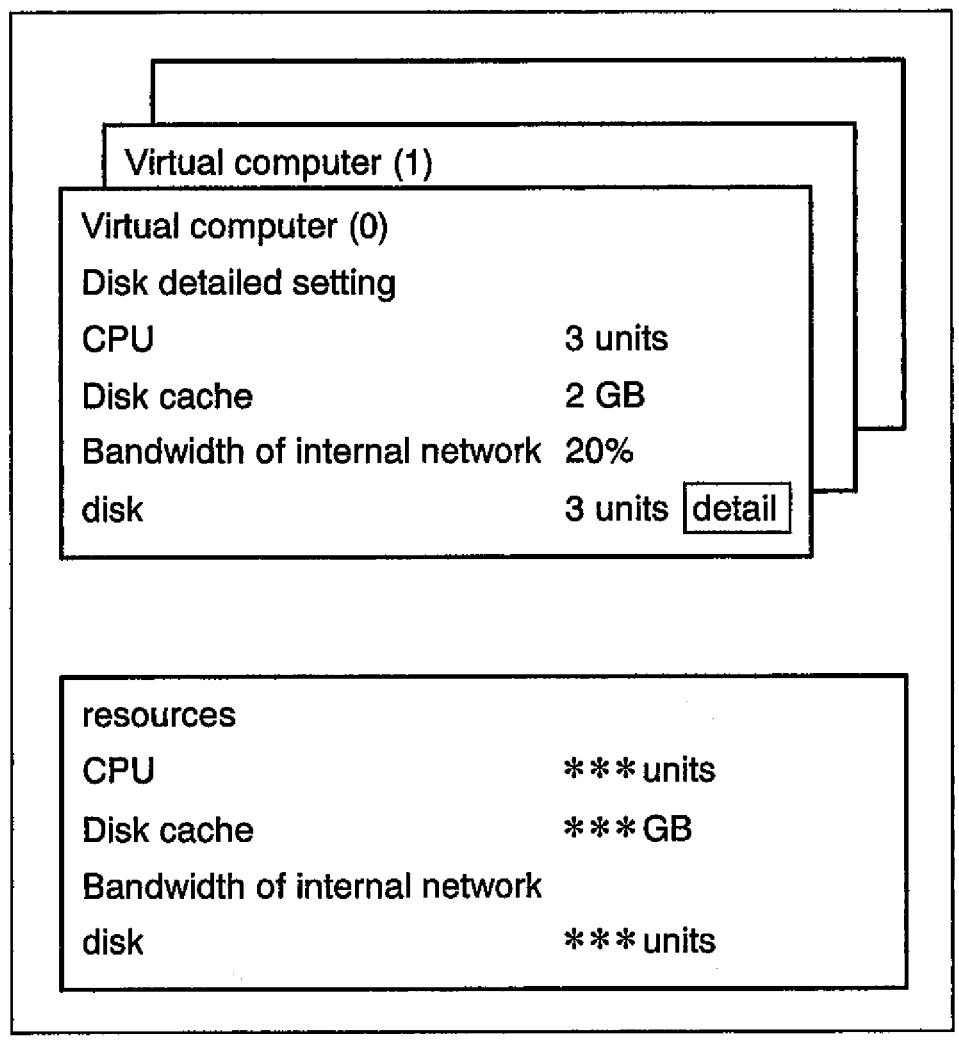
FIG. 18 illustrates a computer system configuration screen according to the fourth embodiment.

FIG. 18 illustrates a computer system configuration screen according to the fourth embodiment of the present invention.

On the right of the word "CPU" in the upper window is a field for entry of the number of control processors 212 for the virtual computer (0) 131. On the right of the words "Disk cache" is a field for entry of the capacity of the disk cache which is allocated to the virtual computer (0) 131. On the right of the words "Bandwidth of internal network" is a field for entry of the bandwidth (allocation rate) of the internal network 1104 in the storage system 200 which is allocated to the virtual computer (0) 131. On the right of the word "disk" is a field for entry of the number of logical units 231 which are allocated to the virtual computer (0) 131. A detailed setting window (FIG. 12) which shows physical disks as constituents of each logical unit and enables detailed setting is called by clicking on the "detail" button in the "disk" line.

What is claimed is:

1. A computer system comprising:
a server being configured to manage a first virtual machine to which a first part of a server resource included in the server is allocated and a second virtual machine to which a second part of the server resource is allocated;
a storage apparatus including a storage controller, a cache memory and a plurality of storage devices; and
a management terminal coupled to the storage apparatus;
wherein the storage apparatus is configured to create a first virtual storage apparatus to which a first storage area on the plurality of storage devices and a first capacity of the cache memory is allocated and a second virtual storage apparatus to which a second storage area on the plurality of storage devices and a second capacity of the cache memory is allocated, wherein the first capacity and the second capacity of the cache memory is instructed by the management terminal,
wherein the first virtual machine corresponds to the first virtual storage apparatus, and the second virtual machine corresponds to the second virtual storage apparatus, wherein the first virtual storage apparatus has a first virtual storage identifier and the second virtual storage apparatus has a second virtual storage identifier, wherein the first storage area has a first storage area identifier and the second storage area has a second storage area identifier, wherein a first I/O command, which is issued by the first virtual machine to the first virtual storage apparatus, includes the first virtual storage identifier and a first disk I/O command, and wherein if the storage apparatus receives the first I/O command, the I/O command is transferred to the first virtual storage apparatus by referring the first virtual storage identifier included in the first I/O command to execute the first disk I/O command by the first virtual storage apparatus.

2. A computer system according to claim 1, wherein the first virtual storage identifier is different from the first storage area identifier, and the second virtual storage identifier is different from the second storage area identifier.

3. A computer system according to claim 1, wherein the first virtual machine and the second virtual machine perform independently in the server, and wherein the first virtual storage apparatus and the second virtual storage apparatus perform independently in the storage apparatus.

4. A computer system according to claim 1, further comprising:

a management terminal coupled to the server and the storage apparatus, wherein the management terminal has a server resource management table which is used for management of the first virtual machine and the second virtual machine, and a storage resource management table which is used for management of the first virtual storage apparatus and the second virtual storage apparatus.

5. A computer system according to claim 4, wherein the management terminal further has a management table used for management of a relationship between the first virtual machine and the first virtual storage apparatus and a relationship between the second virtual machine and the second virtual storage apparatus.

6. A computer system comprising:

a server being configured to manage a first virtual machine to which a first part of a server resource included in the server is allocated and a second virtual machine to which a second part of the server resource is allocated;

a storage apparatus including a storage controller, a cache memory and a plurality of storage devices; and a management terminal coupled to the storage apparatus;

wherein the storage apparatus is configured to create a first virtual storage apparatus to which a first storage area on the plurality of storage devices and a first capacity of the cache memory is allocated and a second virtual storage apparatus to which a second storage area on the plurality of storage devices and a second capacity of the cache memory is allocated, wherein the first capacity and the second capacity of the cache memory is instructed by the management terminal;

wherein the first virtual storage apparatus is allocated to the first virtual machine and corresponds to the first storage area in the first virtual storage apparatus and the second virtual storage apparatus is allocated to the second virtual machine and corresponds to the second storage area in the second virtual storage apparatus, respectively, wherein the first virtual storage apparatus has the first virtual identifier and the second virtual storage apparatus has a second virtual identifier, wherein the first storage area has a first storage area identifier and the second storage area has a second storage area identifier, wherein a first I/O command, which is issued by the first virtual machine to the first virtual storage apparatus, includes the first virtual storage identifier and a first disk I/O command, and wherein if the storage apparatus receives the first I/O command, the I/O command is transferred to the first virtual storage apparatus by referring the first virtual storage identifier included in the first I/O command to execute the first disk I/O command by the first virtual storage apparatus.

7. A computer system according to claim 6, wherein the first virtual storage identifier is different from the first storage area identifier, and the second virtual storage identifier is different from the second storage area identifier.

8. A computer system according to claim 6, wherein the first virtual machine and the second virtual machine perform independently in the server, wherein the first virtual storage apparatus and the second virtual storage apparatus perform independently in the storage apparatus.

9. A computer system according to claim 6, further comprising:

a management terminal coupled to the server and the storage apparatus, wherein the management terminal has a server resource management table which is used for management of the first virtual machine and the second virtual machine, and a storage resource management table which is used for management of the first virtual storage apparatus and the second virtual storage apparatus.

10. A computer system according to claim 9, wherein the management terminal further has a management table used for management of relationship between the first virtual machine and the first virtual storage apparatus and relationship between the second virtual machine and the second virtual storage apparatus.

* * * * *